(12) United States Patent
Ukita

(10) Patent No.: US 8,801,034 B2
(45) Date of Patent: Aug. 12, 2014

(54) GAS GENERATOR FOR RESTRAINING DEVICE

(71) Applicant: Daicel Corporation, Osaka (JP)

(72) Inventor: Shinichiro Ukita, Tatsuno (JP)

(73) Assignee: Daicel Corporation, Osaka-shi (JP)

( * ) Notice: Subject to any disclaimer, the term of this patent is extended or adjusted under 35 U.S.C. 154(b) by 0 days.

(21) Appl. No.: 14/070,153

(22) Filed: Nov. 1, 2013

(65) Prior Publication Data

US 2014/0123869 A1    May 8, 2014

Related U.S. Application Data

(60) Provisional application No. 61/722,050, filed on Nov. 2, 2012.

(30) Foreign Application Priority Data

Nov. 2, 2012   (JP) ................................. 2012-242467

(51) Int. Cl.
*B60R 21/264*    (2006.01)
*B60R 21/26*    (2011.01)

(52) U.S. Cl.
CPC ............... *B60R 21/264* (2013.01); *B60R 21/26* (2013.01); *B60R 2021/2648* (2013.01)
USPC .......................................... 280/741; 280/736

(58) Field of Classification Search
CPC   B60R 21/26; B60R 21/264; B60R 2021/264; B60R 2021/2642; B60R 2021/2644; B60R 2021/2648
USPC ................................................ 280/736, 741
See application file for complete search history.

(56) References Cited

U.S. PATENT DOCUMENTS

| 4,998,751 | A | * | 3/1991 | Paxton et al. | ................. | 280/741 |
| 5,114,179 | A | * | 5/1992 | Emery et al. | ................. | 280/741 |
| 5,221,107 | A | * | 6/1993 | O'Loughlin | ............... | 280/728.1 |
| 5,346,254 | A | * | 9/1994 | Esterberg | ...................... | 280/741 |
| 5,531,474 | A | * | 7/1996 | Osborne et al. | ............... | 280/740 |

(Continued)

FOREIGN PATENT DOCUMENTS

| JP | 9-207705 A | 8/1997 |
| JP | 2001-233167 A | 8/2001 |
| JP | 2002-29362 A | 1/2002 |
| JP | 2003-312435 A | 11/2003 |

*Primary Examiner* — Ruth Ilan
*Assistant Examiner* — Barry Gooden, Jr.
(74) *Attorney, Agent, or Firm* — Birch, Stewart, Kolasch & Birch, LLP

(57) ABSTRACT

A gas generator includes, a housing, an ignition device chamber, a combustion chamber, a filter facing a top plate of the housing, and a retainer supporting the filter and having first and second retainers. The first retainer includes a filter support abutting a lower surface of the filter, an annular wall positioned at outer circumference of the filter support, a plate portion extending outward from the annular wall, and a tubular wall extending axially from the plate portion, and the second retainer includes a support surface supporting the outer circumferential surface, and a support bottom extending inward from the support surface. The support bottom is positioned between the plate portion and the lower surface and that an inner circumferential edge of the support bottom abuts the annular wall surface. At least a part of the lower surface and the outer circumferential surface is supported by the first and second retainers.

9 Claims, 1 Drawing Sheet

(56) References Cited

U.S. PATENT DOCUMENTS

| | | | |
|---|---|---|---|
| 5,624,133 A * | 4/1997 | Wong | 280/740 |
| 6,149,746 A * | 11/2000 | Blomquist | 149/46 |
| 6,199,906 B1 * | 3/2001 | Trevillyan et al. | 280/741 |
| 6,513,834 B1 * | 2/2003 | Blomquist | 280/741 |
| 6,581,963 B2 * | 6/2003 | Mangum | 280/741 |
| 7,044,502 B2 * | 5/2006 | Trevillyan et al. | 280/741 |
| 7,350,810 B2 * | 4/2008 | Blessing et al. | 280/736 |
| 7,390,019 B2 * | 6/2008 | Gotoh et al. | 280/741 |
| 7,404,574 B2 * | 7/2008 | Hirooka et al. | 280/741 |
| 7,578,522 B2 * | 8/2009 | Hanano et al. | 280/740 |
| 7,648,163 B2 * | 1/2010 | Hanano et al. | 280/736 |
| 8,424,908 B2 * | 4/2013 | Kobayashi et al. | 280/741 |
| 8,459,692 B2 * | 6/2013 | Numoto | 280/736 |
| 8,585,085 B2 * | 11/2013 | Kobayashi et al. | 280/741 |
| 8,585,086 B2 * | 11/2013 | Yamazaki et al. | 280/741 |
| 2003/0010247 A1 | 1/2003 | Miyaji et al. | |
| 2003/0025311 A1 * | 2/2003 | Mangum | 280/736 |
| 2003/0127840 A1 | 7/2003 | Nakashima et al. | |
| 2003/0132623 A1 | 7/2003 | Iwai et al. | |
| 2005/0035579 A1 * | 2/2005 | Canterberry et al. | 280/741 |
| 2005/0161923 A1 * | 7/2005 | Hirooka et al. | 280/741 |
| 2005/0184497 A1 | 8/2005 | Miyaji et al. | |
| 2005/0184498 A1 * | 8/2005 | Trevillyan et al. | 280/741 |
| 2005/0250350 A1 | 11/2005 | Nakashima et al. | |
| 2006/0088456 A1 * | 4/2006 | Hanano et al. | 422/198 |
| 2006/0119087 A1 * | 6/2006 | Blessing et al. | 280/736 |
| 2006/0151978 A1 | 7/2006 | Miyaji et al. | |
| 2007/0046005 A1 * | 3/2007 | Hanano et al. | 280/736 |
| 2007/0222195 A1 * | 9/2007 | Yabuta et al. | 280/740 |
| 2009/0121464 A1 * | 5/2009 | Numoto et al. | 280/741 |
| 2011/0193330 A1 * | 8/2011 | Kobayashi et al. | 280/741 |
| 2011/0248486 A1 * | 10/2011 | Numoto | 280/741 |
| 2013/0233196 A1 * | 9/2013 | Kobayashi et al. | 102/530 |

* cited by examiner

GAS GENERATOR FOR RESTRAINING DEVICE

This nonprovisional application claims priority under 35 U.S.C. §119(a) to Patent Application No. 2012-242467 filed in Japan on 2 Nov. 2012 and 35 U.S.C. §119(e) to U.S. Provisional application No. 61/722,050 filed on 2 Nov. 2012, which are incorporated by reference.

BACKGROUND OF THE INVENTION

1. Filed of the Invention

The present invention relates to a gas generator for a restraining device such as an airbag system for a vehicle.

2. Background of the Invention

In a pyrotechnic gas generator using a solid gas generating agent, a filter is used for cooling the combustion gas or arresting combustion residues generated during actuation.

When the filter is disposed inside a housing, positioning thereof is important and it is desirable that the positioning could be done in a simple manner.

After the filter has been disposed inside the housing, it is necessary to fix the filter tightly in order to prevent the filter from getting loose under the effect of external vibrations.

US-A No. 2003/0132623 discloses a gas generator in which a filter is disposed in the upper portion of a combustion chamber, as shown in (e) in FIG. 2. The filter has an annular shape, a gap is present between the outer circumferential surface thereof and the circumferential wall of the housing, and a gap is also present between the inner circumferential surface of the filter and an inner tubular portion.

SUMMARY OF THE INVENTION

The present invention provides a gas generator, comprising:

a housing forming an outer shell and including a top plate, a bottom plate and a circumferential wall provided with a gas discharge port;

an ignition device chamber provided in the housing and defined by a cylindrical container which has one end closed, and accommodating an ignition device;

a combustion chamber formed to surround the ignition device chamber and charged with a gas generating agent;

an annular or disk-shaped filter arranged to face the top plate and form a gap with the circumferential wall; and an annular retainer supporting the filter, the annular retainer being formed by a combination of a first retainer including a filter support portion being formed by an annular flat-plate and abutting against a lower surface of the filter, an annular wall surface portion positioning at outer circumference of the filter support portion and extending towards the bottom plate, an annular flat-plate portion extending radially outward from the annular wall surface portion, and a tubular wall portion extending axially from the annular flat-plate portion and being fixed to the circumferential wall of the housing, and a second retainer including, a tubular support surface portion supporting an outer circumferential surface of the filter, and an annular support bottom portion extending radially inward from the tubular support surface portion, the first retainer and the second retainer being combined such that the annular support bottom portion of the second retainer positions between the annular flat-plate portion of the first retainer and the lower surface of the filter and that an inner circumferential edge of the annular support bottom portion of the second retainer abuts against the annular wall surface portion, at least a part of the lower surface and the outer circumferential surface of the filter being supported by the combination of the first retainer and the second retainer.

BRIEF DESCRIPTION OF THE DRAWINGS

The present invention will become more fully understood from the detailed description given hereinbelow and the accompanying drawings which are give by way of illustration only, and thus are not limitative of the present invention and wherein.

DETAILED DESCRIPTION OF INVENTION

Figure 2:
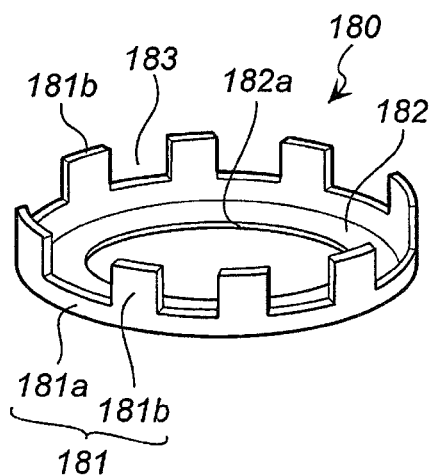
FIG. 2 shows a perspective view illustrating another embodiment of the second retainer to be used in the gas generator shown in FIG. 1.

In the embodiment shown in (e) in FIG. 2 of US-A No. 2003/0132623, since no means is provided for determining the radial position of the filter, the filter can move during or after assembling, and in this regard there is still room for improvement.

One aspect of the present invention provides a gas generator such that the operation of mounting the filter during assembling is easily performed and the filter is fixed to be prevented from moving under the effect of external vibrations after the assembling.

In the gas generator in accordance with the present invention, it is essential that the annular retainer for supporting the filter is a combination of the first retainer and the second retainer. Both the first retainer and the second retainer are of annular shape having a central hole.

For example, where an output (a gas generation amount) of the gas generator is to be increased or decreased by a design change, a method of increasing or decreasing an amount of the gas generating agent is implemented.

With such a method, a filter amount (filter dimensions) is changed according to the changes in a gas generation amount. In such a case, the present invention makes it possible to use the same first retainer as the annular retainer for supporting the filter and replace only the second retainer.

Therefore, it is possible to adapt easily to design changes and even when a filter of different dimensions is used, the filter can be supported and fixed by the retainer which is the combination of the first retainer and the second retainer.

By using such a combination of the first retainer and second retainer, it is possible to support and fix a filter in any shape such as an annular shape or a disk-shape in the same manner.

In particular, in the gas generator in accordance with the present invention, the first retainer and the second retainer are stacked in a simple manner but since the annular support bottom surface of the second retainer is inserted and held between the lower surface of the filter and the annular flat-plate portion of the first retainer, the retainers hardly move. Therefore, the annular retainers itself are tightly fixed, and the filter supported thereby is fixed in a state in which a gap is obtained between the filter and the circumferential wall of the housing.

In addition to the function of supporting the filter, the tubular support surface portion of the second retainer also has a function of preventing the gap formed between the filter and the circumferential wall of the housing from decreasing due to the deformation and outward bulging of the outer circumferential surface of the filter during actuation.

A preferable aspect of the present invention is the gas generator wherein the filter support portion of the first retainer has a protruding portion protruding towards the top plate, the lower surface of the filter has a depression receding in a thickness direction at a position directly opposite the protruding portion, and the protruding portion is fitted in the depression.

The combination of the protruding portion and the depression facilitates the operation of mounting the filter, and the filter fixing strength is increased.

The protruding portion may be formed in any part of the filter support portion. For example, the protruding portion may be formed at the inner circumferential edge of the filter support portion, or at any location between the inner circumferential edge and the annular wall surface portion in the filter support portion.

The protruding portion may also be an annular shape continuous along the inner circumferential edge or a plurality of discontinuous protrusions.

The depression may have any shape into which the protruding portion is fitted, for example, an annular shape.

Further, a preferable aspect of the present invention is that the second retainer of the annular retainers used in accordance with the present invention includes a plurality of through-holes in a thickness direction in the tubular support surface portion, or in an axial direction, depressions and protrusions in the tubular support surface portion, and the depressions and protrusions are formed alternately in a circumferential direction.

Portions corresponding to the through-holes and depressions in the tubular support surface portion function as outlets for the combustion gas passing through the filter.

Further, a preferable aspect of the present invention is the gas generator wherein the filter is an annular filter and an upper surface thereof abuts against the top plate, the cylindrical container is disposed in contact with or close to the top plate of the housing, and the annular filter is supported and fixed by the annular retainer so that a gap is formed between the annular filter and an circumferential wall in the vicinity of a bottom surface of the cylindrical container.

The gap functions as a space for allowing the combustion gas generated in the combustion chamber to flow in from the inner circumferential surface of the annular filter. The inflow surface of the combustion gas is expanded and smooth gas discharge is obtained.

In the gas generator in accordance with the present invention, the filter is supported and fixed by the combination of two retainers, namely, the first retainer and the second retainer, the operation of mounting the filter during the assembling is facilitated, and the filter is fixed to be prevented from moving under the effect of external vibrations.

Since the combination of two retainers, namely, the first retainer and the second retainer, is used, where the output (gas generation amount) of the gas generator is to be increased or decreased by a design change, even if the filter dimensions are changed accordingly, it is easy to adapt to such a change by using the same first retainer and replacing only the second retainer.

Figure 1:
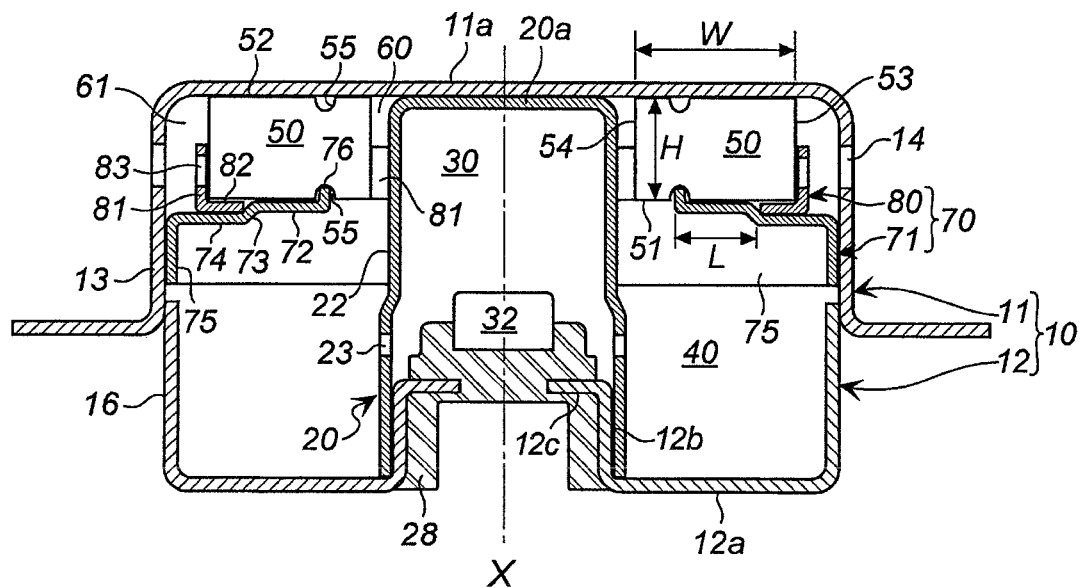
FIG. 1 shows an axial sectional view of the gas generator in accordance with the present invention.

Embodiments of the Invention (1) Gas Generator Shown in FIG. 1

An embodiment of the gas generator in accordance with the present invention is explained below with reference to FIG. 1.

A housing 10 serving as an outer shell container is obtained by integrating a diffuser shell 11 and a closure shell 12 by a known method (welding or the like).

The diffuser shell 11 has a top plate 11a and an upper circumferential wall (a circumferential wall on the diffuser shell side) 13.

A plurality of gas discharge ports 14 is formed in the upper circumferential wall 13. The gas discharge ports are closed with a closing member such as a seal tape from the inner side prior to actuation.

The closure shell 12 has a bottom plate 12a and a lower circumferential wall (a circumferential wall on the closure shell side) 16.

A tubular portion 12b protruding towards the inside of the housing and an annular flat portion 12c extending radially inward from the upper end of the tubular portion are formed in the central portion of the bottom plate 12a. The center of the hole of the annular flat portion 12c matches the axis X.

In FIG. 1, the length (dimension) of the upper circumferential wall 13 and the lower circumferential wall 16 in the direction of the axis X are such that the upper circumferential wall 13 is longer, but it is acceptable that the lower circumferential wall 16 is longer or that the two circumferential walls have the same length.

A cylindrical container (a cup-shaped container) 20 that is closed at one end is disposed inside the housing 10.

In the cup-shaped container 20, the opening of the cylindrical container (a circumferential wall 22) is closed with a lid (a bottom surface 20a), but the container may be in a cup shape in which the bottom surface 20a and the circumferential wall 22 are formed integrally.

The bottom surface 20a of the cup-shaped container is abutted against the top plate 11a, but a gap may be present between the bottom surface 20a and the top plate 11a. When a disk-shaped filter is used instead of an annular filter 50, the arrangement is such that a gap larger in size than the thickness of the disk-shaped filter is formed between the top plate 11a and the bottom surface 20a.

A plurality of communication holes 23 is formed in the circumferential wall 22 of the cup-shaped container 20. The communication holes are closed with a seal tape prior to actuation.

The cup-shaped container 20 is press-fitted from the opening to the tubular potion 12b of the bottom plate 12a of the closure shell and fixed thereto.

The cup-shaped container 20 may be welded to the bottom plate 12a of the closure shell.

The interior of the cup-shaped container 20 is an ignition device chamber 30 accommodating an ignition device. The ignition device is a combination of a known electric igniter 32 and a known transfer charge or gas generating agent (not shown in the drawing), but the electric igniter 32 alone may be used.

The electric igniter 32 is integrated by a resin 28 with the closure shell 12, and the inner surface of the tubular potion 12b and the annular flat portion 12c are covered by the resin 28.

The exterior of the cup-shaped container 20 (the ignition device chamber 30) is a combustion chamber 40 accommodating a known gas generating agent (not shown in the drawing).

The combustion chamber 40 and the ignition device chamber 30 are communicated with each other by a communication hole 23 during actuation.

The annular filter 50 is disposed at the upper side (the top plate 11a side) of the combustion chamber 40 and supported by an annular retainer 70. A disk-shaped filter can be used instead of the annular filter 50.

The annular filter 50 has a lower surface 51, an upper surface 52, an outer circumferential surface 53, and an inner circumferential surface 54.

The inner diameter of the inner circumferential surface 54 of the annular filter is greater than the outer diameter of the cup-shaped container 20, whereby a gap 60 is formed.

The outer diameter of the outer circumferential surface 53 of the annular filter is less than the inner diameter of the upper circumferential wall 13, whereby a gap 61 is formed.

In the annular filter 50, annular depressions 55 are formed at the lower surface 51 and the upper surface 52 at positions facing each other in the thickness direction. That is, preferably in the filter, another depression is formed also at the upper surface of the filter to face the depression.

The annular depression 55 may be formed only in the lower surface 51, but it is preferable from the standpoint of assembling ability that the annular depressions are formed at the same position in both the lower surface 51 and the upper surface 52, because the filter can be disposed regardless of the vertical orientation thereof.

The annular retainer 70 is a combination of a first retainer 71 and a second retainer 80.

The first retainer 71 has a central hole allowing the cup-shaped container 20 to pass therethrough and includes a filter support portion 72, an annular wall surface portion 73, an annular flat-plate portion 74, and a tubular wall portion 75.

The filter support portion 72 is an annular flat-plate abutted against the lower surface 51 of the filter 50.

The annular wall surface portion 73 is positioned on the outer circumferential side of the filter support portion 72 and extends towards the bottom plate 12a.

The annular flat-plate portion 74 extends radially outward from the annular wall surface portion 73. The tubular wall 75 extends in the axis X direction from the annular flat-plate portion 74.

An annular protruding portion 76 protruding towards the top plate 11a is formed at the distal end (on the inner circumferential edge side) of the filter support portion 72.

A plurality of through-holes extending in the thickness direction can be formed in the filter support portion 72. The through-holes function as inflow holes allowing the combustion gas generated inside the combustion chamber 40 to flow into the annular filter 50.

Further, preferably in the present invention, a plurality of depressions and protrusions are formed, in circumferential direction, at an inner circumferential edge of the filter support portion 72. In detail, instead of the through-holes, the filter support portion 72 may have a plurality of depressions and protrusions cut in a comb-shaped form from the inner circumferential edge thereof in the circumferential direction. In this case, the protrusions formed at the inner circumferential edge of the filter support portion 72 are discontinuous independent protrusions arranged in the circumferential direction.

A position of the annular depression 55 or a length L is determined such that the cross-sectional area of the gap formed between the filter support portion 72, which may include the annular protruding portion 76, and the circumferential wall 22 of the inner cylindrical container 20 is not less than the total opening area of the gas discharge ports 14.

The annular wall surface portion 73 is positioned between the filter support portion 72 and the annular flat-plate portion 74 and may be a vertical wall surface extending towards the bottom plate 12a (in the axis X direction) or an inclined wall surface extending towards the bottom plate 12a (towards the outer circumferential portion of the bottom plate 12a).

The first retainer 71 is fixed by press-fitting the tubular wall portion 75 to the upper circumferential wall 13.

If a length of the lower circumferential wall 16 in the axis X direction is larger than a length of the upper circumferential wall 13 in the axis X direction in FIG. 1, the first retainer 71 may be fitted and fixed to the lower circumferential wall 16.

The second retainer 80 has a tubular support surface portion 81 supporting the outer circumferential surface 53 of the filter, and an annular support bottom portion 82 extending radially inward from the tubular support surface portion 81.

The tubular support surface portion 81 has a plurality of through-holes 83 in the thickness direction.

The second retainer 80 is positioned such that the annular support bottom portion 82 is inserted between the annular flat-plate portion 74 of the first retainer and the lower surface 51 of the filter and that the inner circumferential edge of the annular support bottom portion 82 is abutted against the annular wall surface portion 73.

The thickness of the annular support bottom portion 82 is set to be equal to the height of the annular wall surface portion 73 (a gap formed by the annular flat-plate portion 74 and the lower surface 51 of the filter).

Preferably, a thickness of the annular support bottom portion 82 is set to be equal to a height of the annular wall surface portion (a gap formed between the annular flat-plate portion 74 and the lower surface 51 of the filter.

As described hereinabove, by adjusting the length (L) of the filter support portion 72, it is also possible to adjust the contact length of the annular support bottom portion 82 and the annular flat-plate portion 74. Where the contact length is too small, the fixing strength of the second retainer 80 in the axis X direction decreases. Therefore, by adjusting the length (L) of the filter support portion 72 in association with the width (W) of the annular filter 50, it is possible to ensure the necessary fixing strength of the second retainer 80 in the axis X direction.

The annular filter 50 is supported and fixed in the following manner by the annular retainer 70 which is the combination of the first retainer 71 and the second retainer 80.

The first retainer 71 is fixed to the upper circumferential wall 13 at the tubular wall 75.

The second retainer 80 is prevented from moving in the axis X direction by inserting the annular support bottom portion 82 between the annular flat-plate portion 74 of the first retainer and the lower surface 51 of the filter. And, since the inner circumferential edge of the annular support bottom portion 82 is abutted against the annular wall surface portion 73, the second retainer is prevented from moving in the radial direction.

The annular retainer 70, which is the combination of the first retainer 71 and the second retainer 80, is thus fixed to the housing 10.

The annular protruding portion 76 of the filter support portion 72 in the first retainer 71 is fitted in the annular depression 55 of the lower surface 51 of the annular filter 50.

Part of lower surface 51 of the annular filter 50 from the annular depression 55 to the outer circumferential surface 53 is supported by the filter support portion 72 of the first retainer, and the remaining part is supported by the annular support bottom portion 82 of the second retainer. Since the lower surface 51 on the inner circumferential surface 54 side, which is not supported by the retainers, is exposed inside the combustion chamber 40, the combustion gas flows in from the exposed surface. Preferably in the filter, the lower surface in a side of an inner circumferential surface, which is not supported by the first retainer, is exposed inside the combustion chamber 40.

The tubular support surface portion 81 of the second retainer is abutted against the outer circumferential surface 53 of the annular filter 50.

The upper surface 52 of the annular filter 50 is abutted against the top plate 11a.

The annular retainer 70, which is the combination of the first retainer 71 and the second retainer 80, is thus fixed to the housing, and the annular filter 50 is fixed by the annular retainer 70 supporting the lower surface 51 and the outer circumferential surface 53 of the annular filter 50 and the top plate 11a supporting the upper surface 52.

Since the annular filter 50 is further supported by the annular retainer 70, the gap 60 is formed between the inner circumferential surface 54 and the circumferential wall 22 of the cup-shaped container 20 on the bottom surface 20a side, and the gap 61 is formed between the outer circumferential surface 53 of the annular filter 50 and the upper circumferential wall 13 having the gas discharge ports 14.

The gap 60 functions to allow the combustion gas, generated by combustion of the gas generating agent during actuation, to flow from the inner circumferential surface 54 into the annular filter 50, and the gap 61 functions to prevent the combustion gas flowing into the annular filter 50 from being discharged after passing only through a specific narrow portion of the annular filter 50.

Since the annular retainer 70 is the combination of the first retainer 71 and the second retainer 80, even the replacement with an annular filter 50 of a different width W is easily performed.

Where the amount of the gas generating agent is increased to increase the output of the gas generator, a larger amount of combustion gas is generated. Therefore, it can be necessary to increase the filtration capacity by using an annular filter 50 of a larger width W.

In such a case, the present invention makes it possible to replace only the second retainer 80 according to the changes in the dimensions of an annular filter 50 and use the same first retainer 71.

When the output of the gas generator is reduced and an annular filter 50 of a smaller width W is used, contrary to the above-described case, it is still possible to replace only the second retainer 80.

The operation of the gas generator shown in FIG. 1 is explained below.

Where the igniter 32 is actuated, the gas generating agent (or transfer charge) in the ignition device chamber 30 is ignited and burned, and combustion products are generated. The combustion products are discharged from the communication holes 23 into the combustion chamber 40, and the gas generating agent located inside the combustion chamber 40 is ignited and burned.

The combustion gas generated in the combustion chamber enters the interior of the filter 50 from a part of the lower surface 51 of the filter 50 that is not covered by the filter support portion 72 of the first retainer, and, due to the presence of the gap 60, the gas enters also from the inner circumferential surface 54, and flows radially outward.

The combustion gas then flows through the outer circumferential surface 53 of the filter and the through-holes 83 of the second retainer 80 into the gap 61, ruptures the seal tape and is discharged from the gas discharge ports 14.

In this process, the central portion of the diffuser shell 11 is deformed to bulge due to the increase in internal pressure, but since the first retainer 71 and the annular filter 50 are also deformed and pushed towards the top plate 11a, the occurrence of a short passing, in which the combustion gas is discharged between the top plate 11a and the upper surface 52 or between the first retainer 71 and the lower surface 51, without passing inside the annular filter 50, is prevented.

Further, since the second retainer 80 is strongly held and fixed between the first retainer 71 and the annular filter 50, the outer circumferential surface 53 of the annular filter is prevented by the tubular support surface portion 81 from expanding towards the gap 61 and closing the gas passage (the gap 61).

(2) Retainer Shown in FIG. 2

FIG. 2 is a perspective view illustrating another embodiment of the second retainer 80 shown in FIG. 1. A second retainer 180 is combined with the first retainer 71 shown in FIG. 1 to obtain the annular retainer 70.

The second retainer 180 has an tubular support surface portion 181 supporting the outer circumferential surface 53 of the filter, and an annular support bottom portion 182 extending radially inward from the tubular support surface portion 181. An inner circumferential edge 182a of the annular support bottom portion 182 is a portion abutted against the annular wall surface portion 73 of the first retainer 71 shown in FIG. 1.

The tubular support surface portion 181 includes an annular base plate portion 181a and a plurality of protrusions 181b rising vertically (provided in the axis X direction when mounted on the gas generator) from the annular base plate portion 181a.

Since the plurality of protrusions 181b is formed at equal intervals in the circumferential direction, a plurality of depressions 183 is formed between the plurality of protrusions 181b, and the depressions 183 function similarly to the through-holes 83 of the second retainer 80 shown in FIG. 1.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
a housing forming an outer shell and including a top plate, a bottom plate and a circumferential wall provided with a gas discharge port;
an ignition device chamber provided in the housing and defined by a cylindrical container which has one end closed, and accommodating an ignition device;
a combustion chamber formed to surround the ignition device chamber and charged with a gas generating agent;
an annular or disk-shaped filter arranged to face the top plate and form a gap with the circumferential wall; and
an annular retainer supporting the filter, the annular retainer being formed by a combination of
a first retainer including
a filter support portion being formed by an annular flat-plate and abutting against a lower surface of the filter,
an annular wall surface portion positioning at an outer circumference of the filter support portion and extending towards the bottom plate,
an annular flat-plate portion extending radially outward from the annular wall surface portion, and a tubular wall portion extending axially from the annular flat-plate portion and being fixed to the circumferential wall of the housing, and a second retainer including, a tubular support surface portion supporting an outer circumferential surface of the filter, and an annular support bottom portion extending radially inward from the tubular support surface portion, the first retainer and the second retainer being combined such that the annular support bottom portion of the second retainer positions between the annular flat-plate portion of the first retainer and the lower surface of the filter and that an inner circumferential edge of the annular support bottom portion of the second retainer abuts against the annular wall surface portion, at least a part of the lower surface and the outer circumferential surface of the filter being supported by the combination of the first retainer and the second retainer.

2. The gas generator according to claim 1, wherein the second retainer includes a plurality of through-holes in a thickness direction in the tubular support surface portion.

3. The gas generator according to claim 1, wherein the second retainer includes, in an axial direction, depressions and protrusions in the tubular support surface portion, and the depressions and the protrusions are formed alternately in a circumferential direction.

4. The gas generator according to claim 1, wherein the filter is an annular filter and an upper surface thereof abuts against the top plate, the cylindrical container is disposed in contact with or close to the top plate of the housing, and the annular filter is supported and fixed by the annular retainer so that a gap is formed between the annular filter and a circumferential wall in a vicinity of a bottom surface of the cylindrical container.

5. The gas generator according to claim 1, wherein the filter support portion includes a plurality of through-holes extending in a thickness direction thereof or a plurality of depressions and protrusions formed in an inner circumferential edge thereof in a circumferential direction.

6. The gas generator according to claim 1, wherein a thickness of the annular support bottom portion is set to be equal to a height of the annular wall surface portion.

7. The gas generator according to claim 1, wherein the filter is an annular filter and the lower surface of the annular filter in a side of an inner circumferential surface, which is not supported by the first retainer, is exposed inside the combustion chamber.

8. The gas generator according to claim 1, wherein the filter support portion of the first retainer has a protruding portion protruding towards the top plate, the lower surface of the filter has a depression receding in a thickness direction at a position directly opposite the protruding portion, and the protruding portion is fitted in the depression.

9. The gas generator according to claim 8, wherein another depression is provided in an upper surface of the filter.

* * * * *